(12) United States Patent
Shakimov et al.

(10) Patent No.: US 10,560,320 B2
(45) Date of Patent: Feb. 11, 2020

(54) RANKING OF GATEWAYS IN CLUSTER (71) Applicant: Nicira, Inc., Palo Alto, CA (US)

(72) Inventors: Amre Shakimov, San Jose, CA (US); Igor Ganichev, Mountain View, CA (US); Pankaj Thakkar, Cupertino, CA (US); Ansis Atteka, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 49 days.

(21) Appl. No.: 15/196,530

(22) Filed: Jun. 29, 2016

(65) Prior Publication Data

US 2018/0006880 A1 Jan. 4, 2018

(51) Int. Cl.
*H04L 12/24* (2006.01)
*H04L 29/08* (2006.01)

(52) U.S. Cl.
CPC ........ *H04L 41/0806* (2013.01); *H04L 69/325* (2013.01)

(58) Field of Classification Search
CPC .................................................. H04L 61/2007
USPC ......................................................... 709/222
See application file for complete search history.

(56) References Cited

U.S. PATENT DOCUMENTS

| 5,504,921 A | 4/1996 | Dev et al. |
| 5,550,816 A | 8/1996 | Hardwick et al. |
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |

(Continued)

FOREIGN PATENT DOCUMENTS

| CN | 101018159 A | 8/2007 |
| CN | 101981560 A | 2/2011 |

(Continued)

OTHER PUBLICATIONS

Caesar, Matthew, et al., "Design and Implementation of a Routing Control Platform," NSDI '05: 2nd Symposium on Networked Systems Design & Implementation, Apr. 2005, 14 pages, USENIX Association.

(Continued)

*Primary Examiner* — S M A Rahman
*Assistant Examiner* — Emad Siddiqi
(74) *Attorney, Agent, or Firm* — Adeli LLP (57) ABSTRACT

Some embodiments provide a method for managing a set of forwarding elements. The method receives configuration information for a set of gateways specifying (i) multiple gateways for implementing logical router ports and (ii) a ranking order of the gateways in the set. The method configures a first gateway in the ranking order as a master gateway for the set of gateways. Upon receiving a first notification that the first gateway is not operational, the method configures a second gateway in the ranking order as the master gateway for the set of gateways. Upon receiving a second, subsequent notification that the first gateway has resumed operation, the method maintains the second gateway in the ranking order as the master gateway for the set of gateways and configures the first gateway in the ranking order as a first standby gateway.

21 Claims, 5 Drawing Sheets

(56) References Cited

U.S. PATENT DOCUMENTS

| | | | |
|---|---|---|---|
| 6,512,745 B1 | 1/2003 | Abe et al. | |
| 6,539,432 B1 | 3/2003 | Taguchi et al. | |
| 6,680,934 B1 | 1/2004 | Cain | |
| 6,754,220 B1* | 6/2004 | Lamberton | H04L 12/2856 340/2.1 |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Le Pennec et al. | |
| 6,999,454 B1 | 2/2006 | Crump | |
| 7,046,630 B2 | 5/2006 | Abe et al. | |
| 7,152,179 B1* | 12/2006 | Critchfield | H04L 12/56 714/4.11 |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,260,648 B2 | 8/2007 | Tingley et al. | |
| 7,283,473 B2 | 10/2007 | Arndt et al. | |
| 7,342,916 B2 | 3/2008 | Das et al. | |
| 7,391,771 B2 | 6/2008 | Orava et al. | |
| 7,428,220 B1 | 9/2008 | Caronni et al. | |
| 7,450,498 B2 | 11/2008 | Golia et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,411 B2 | 1/2009 | Weinstein et al. | |
| 7,519,734 B1 | 4/2009 | Dumitriu et al. | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,647,426 B2 | 1/2010 | Patel et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,014,278 B1 | 9/2011 | Subramanian et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,194,674 B1 | 6/2012 | Pagel et al. | |
| 8,199,750 B1 | 6/2012 | Schultz et al. | |
| 8,218,454 B2 | 7/2012 | Hajiaghayi et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,572 B1 | 8/2012 | Brandwine et al. | |
| 8,259,571 B1 | 9/2012 | Raphel et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,650 B2 | 1/2013 | Foxworthy et al. | |
| 8,351,418 B2 | 1/2013 | Zhao et al. | |
| 8,370,834 B2 | 2/2013 | Edwards et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,627,313 B2 | 1/2014 | Edwards et al. | |
| 8,644,188 B1 | 2/2014 | Brandwine et al. | |
| 8,660,129 B1 | 2/2014 | Brendel et al. | |
| 8,705,513 B2 | 4/2014 | Van Der Merwe et al. | |
| 8,762,507 B1 | 6/2014 | Ingram et al. | |
| 8,775,599 B2 | 7/2014 | Bansal et al. | |
| 8,902,743 B2 | 12/2014 | Greenberg et al. | |
| 8,904,028 B2 | 12/2014 | Iannaccone et al. | |
| 8,958,298 B2 | 2/2015 | Zhang et al. | |
| 8,997,094 B2 | 3/2015 | Bosch et al. | |
| 9,059,999 B2 | 6/2015 | Koponen et al. | |
| 9,201,837 B2 | 12/2015 | Egi et al. | |
| 9,203,703 B2 | 12/2015 | Koponen et al. | |
| 9,225,597 B2 | 12/2015 | Tubaltsev et al. | |
| 9,270,581 B2 | 2/2016 | Guellal et al. | |
| 9,450,852 B1 | 9/2016 | Chen et al. | |
| 9,503,371 B2 | 11/2016 | Thakkar et al. | |
| 9,577,845 B2 | 2/2017 | Thakkar et al. | |
| 9,590,901 B2 | 3/2017 | Tubaltsev et al. | |
| 9,762,537 B1 | 9/2017 | Eyada | |
| 9,900,224 B2 | 2/2018 | Dumitriu et al. | |
| 10,003,534 B2 | 6/2018 | Thakkar et al. | |
| 10,038,628 B2 | 7/2018 | Ravinoothala et al. | |
| 10,091,161 B2 | 10/2018 | Dubey et al. | |
| 10,164,881 B2 | 12/2018 | Tubaltsev et al. | |
| 10,237,123 B2 | 3/2019 | Dubey et al. | |
| 2001/0043614 A1 | 11/2001 | Viswanadham et al. | |
| 2002/0093952 A1 | 7/2002 | Gonda | |
| 2002/0095498 A1 | 7/2002 | Chanda et al. | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2004/0073659 A1 | 4/2004 | Rajsic et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0120160 A1 | 6/2005 | Plouffe et al. | |
| 2005/0132044 A1 | 6/2005 | Guingo et al. | |
| 2006/0002370 A1 | 1/2006 | Rabie et al. | |
| 2006/0018253 A1 | 1/2006 | Windisch et al. | |
| 2006/0026225 A1 | 2/2006 | Canali et al. | |
| 2006/0029056 A1 | 2/2006 | Perera et al. | |
| 2006/0056317 A1 | 3/2006 | Manning et al. | |
| 2006/0056412 A1 | 3/2006 | Page | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0198321 A1 | 9/2006 | Nadeau et al. | |
| 2006/0239271 A1 | 10/2006 | Khasnabish et al. | |
| 2006/0291388 A1 | 12/2006 | Amdahl et al. | |
| 2007/0028244 A1 | 2/2007 | Landis et al. | |
| 2007/0043860 A1 | 2/2007 | Pabari | |
| 2007/0064673 A1 | 3/2007 | Bhandaru et al. | |
| 2007/0140128 A1 | 6/2007 | Klinker et al. | |
| 2007/0140235 A1 | 6/2007 | Aysan et al. | |
| 2007/0156919 A1 | 7/2007 | Potti et al. | |
| 2007/0201357 A1 | 8/2007 | Smethurst et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0013474 A1 | 1/2008 | Nagarajan et al. | |
| 2008/0031263 A1 | 2/2008 | Ervin et al. | |
| 2008/0049621 A1 | 2/2008 | McGuire et al. | |
| 2008/0049646 A1 | 2/2008 | Lu | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |

(56) References Cited

U.S. PATENT DOCUMENTS

| | | |
|---|---|---|
| 2008/0151893 A1 | 6/2008 | Nordmark et al. |
| 2008/0159301 A1 | 7/2008 | De Heer |
| 2008/0189769 A1 | 8/2008 | Casado et al. |
| 2008/0198858 A1 | 8/2008 | Townsley et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0016215 A1 | 1/2009 | Nadas et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0046532 A1 | 2/2010 | Okita |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1 | 6/2010 | Tan |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0241767 A1 | 9/2010 | Corry et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0069634 A1 | 3/2011 | Hajiaghayi et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299386 A1 | 12/2011 | Negoto et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0083693 A1 | 4/2013 | Himura et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0212246 A1 | 8/2013 | Koponen et al. |
| 2013/0219078 A1 | 8/2013 | Padmanabhan et al. |
| 2013/0250951 A1 | 9/2013 | Koganti |
| 2013/0254599 A1 | 9/2013 | Katkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0056125 A1 | 2/2014 | Guellal et al. |
| 2014/0156818 A1 | 6/2014 | Hunt |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0341226 A1 | 11/2014 | Okita |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1 | 3/2015 | Thakkar et al. |
| 2015/0063364 A1 | 3/2015 | Thakkar et al. |
| 2015/0244628 A1 | 8/2015 | Gredler et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal et al. |
| 2015/0309901 A1 | 10/2015 | Pershin et al. |
| 2015/0372943 A1 | 12/2015 | Hasan et al. |
| 2016/0080483 A1* | 3/2016 | Li .................. H04L 12/6418 |
| | | 709/226 |
| 2016/0173415 A1 | 6/2016 | Wang et al. |
| 2016/0205196 A1* | 7/2016 | Hasan .................. F24F 11/00 |
| | | 709/208 |
| 2016/0248703 A1 | 8/2016 | Gopalakrishnan et al. |
| 2016/0294612 A1 | 10/2016 | Ravinoothala, Sr. et al. |
| 2016/0301603 A1 | 10/2016 | Park et al. |
| 2017/0005915 A1 | 1/2017 | Mirsky et al. |
| 2017/0118067 A1* | 4/2017 | Vedula ............... H04L 41/0668 |
| 2017/0126493 A1 | 5/2017 | Zhang et al. |
| 2017/0139789 A1 | 5/2017 | Fries et al. |
| 2017/0142012 A1 | 5/2017 | Thakkar et al. |
| 2017/0163532 A1 | 6/2017 | Tubaltsev et al. |
| 2017/0317954 A1 | 11/2017 | Masurekar et al. |
| 2017/0317971 A1 | 11/2017 | Dubey et al. |
| 2018/0176073 A1 | 6/2018 | Dubey et al. |
| 2018/0183667 A1 | 6/2018 | Dubey et al. |
| 2018/0302326 A1 | 10/2018 | Thakkar et al. |
| 2018/0324088 A1 | 11/2018 | Ravinoothala et al. |
| 2019/0075050 A1 | 3/2019 | Tubaltsev et al. |

FOREIGN PATENT DOCUMENTS

| | | |
|---|---|---|
| CN | 102215158 A | 10/2011 |
| CN | 106134137 A | 11/2016 |
| CN | 107534578 A | 1/2018 |
| EP | 1653688 A1 | 5/2006 |

(56) References Cited

FOREIGN PATENT DOCUMENTS

| EP | 2849395 A1 | 3/2015 |
|---|---|---|
| EP | 3117561 A2 | 1/2017 |
| GB | 2419703 | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2008129527 A2 | 10/2008 |
| WO | WO 2013/113265 | 8/2013 |
| WO | 2015138043 A2 | 9/2015 |
| WO | WO 2015/142404 | 9/2015 |
| WO | 2016164277 A1 | 10/2016 |

OTHER PUBLICATIONS

Dobrescu, Minai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM New York, NY, USA.

Dumitriu, Dan Mihai, et al. (U.S. Appl. No. 61/514,990), filed Aug. 4, 2011.

Handley, Mark, et al., "Designing Extensible IP Router Software," Proc. of NSDI, May 2005,14 pages.

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Lakshminarayanan, Karthik, et al., "Routing as a Service," Month Unknown, 2004, 16 pages, Berkeley, California.

Maltz, David A., et al., "Routing Design in Operational Networks: A Look from the Inside," SIGCOMM'04, Aug. 30-Sep. 3, 2004, 14 pages, ACM, Portland, Oregon, USA.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

Non-Published Commonly Owned U.S. Appl. No. 15/387,549, filed Dec. 21, 2016, 56 pages, Nicira, Inc.

Non-Published Commonly Owned U.S. Appl. No. 15/451,372, filed Mar. 6, 2017, 32 pages, Nicira, Inc.

Lin, Pingping, et al., "Seamless Interworking of SDN and IP," SIGCOMM '13, Aug. 12-16, 2013, 2 pages, ACM, New York, USA.

Mechtri, Marouen, et al., "Inter and Intra Cloud Networking Gateway as a Service," 2013 IEEE $2^{nd}$ International Conference on Cloud Networking (ClouNet), Nov. 11, 2013, 8 pages, IEEE.

* cited by examiner

RANKING OF GATEWAYS IN CLUSTER

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In virtualized networks, virtual machines on different subnets may need to communicate with each other as well. In this case, tenants may define a network for virtualization that includes both logical switches and logical routers. In these virtualized networks, techniques to minimize the effects of failover between logical router implementations are needed.

BRIEF SUMMARY

Some embodiments provide a method for managing a set of gateways (e.g., a cluster) that implement logical ports of one or more logical routers. Specifically, some embodiments allow an administrator to specify a ranking order of the gateways in the set, which a network control system that manages the gateways uses to assign one of the gateways as a master at all times (unless all of the gateways in the set are inoperative). Based on this ranking order, as well as the current gateway status, the network control system (e.g., the management plane or central control plane of the network control system) of some embodiments generates an ordered list of the gateways in the cluster, which is distributed to (i) controllers that directly manage the gateways and (ii) controllers that directly manage forwarding elements that send traffic to the gateways.

The ordered list generated for the gateways initially follows the ranking order set by the administrator, and the first gateway in the ordered list is designated as a master for the set of gateways. In some embodiments, the master gateway handles all of the traffic for the set of gateways, and the other forwarding elements send traffic for the logical ports implemented by the set of gateways to the master. The second, third, etc. gateways in the ordered list are designated as standby gateways in case all of the gateways ranked higher have failed (become inoperative). When a gateway becomes inoperative, a new list is generated without the gateway; thus, if the highest-ranked gateway has become inoperative, then the second-highest ranked gateway is now first in the new ordered list. However, when the highest-ranked gateway resumes operation, in some embodiments the highest-ranked gateway is listed second, rather than first, in the new ordered list. Anytime the master gateway is changed, there may be a lag during which some of the forwarding elements are sending packets to the old master. As such, the ordered list generated by the network control system preserves the current master unless that master becomes inoperative. However, in this situation, the highest-ranked gateway would become the first standby (i.e., second in the ordered list). That is, when generating a new list, some embodiments preserve the current master when possible, then order the remaining gateways (standbys) based on the configured ranking order.

As mentioned, in some embodiments the set of gateways implement a logical port of a logical router, or logical ports of multiple logical routers. When a logical router is configured in some embodiments, the administrator may configure multiple logical ports for the logical router. These logical ports may connect to one or more logical switches of the logical network, as well as to other logical routers. Specifically, some logical router ports (referred to as uplink ports) connect to either higher-tier logical routers (e.g., logical routers that are closer to networks external to the logical network) or directly to the external network. The logical routers are implemented in a distributed manner, but may also include centralized components (e.g., for implementing stateful services that require centralization, or for implementing the connection to the external network). Especially in the case of stateful services, the centralized components may be arranged in a master-standby manner. For instance, a logical router with a single uplink port that requires centralized stateful services might have a master centralized component and one or more standby centralized components, each of which are implemented on separate gateways. The administrator, in some such embodiments, specifies a set of gateways to implement the logical router uplink port, and the centralized components operate on the gateway set with the master/standby configuration determined according to the ordered list for the set of gateways.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for managing a set of gateways (e.g., a cluster) that implement logical ports of one or more logical routers. Specifically, some embodiments allow an administrator to specify a ranking order of the gateways in the set, which a network control system that manages the gateways uses to assign one of the gateways as a master at all times (unless all of the gateways in the set are inoperative). Based on this ranking order, as well as the current gateway status, the network control system (e.g., the management plane or central control plane of the network control system) of some embodiments generates an ordered list of the gateways in the cluster, which is distributed to (i) controllers that directly manage the gateways and (ii) controllers that directly manage forwarding elements that send traffic to the gateways.

In some embodiments, the administrator defines a gateway cluster by identifying one or more gateway host machines to group together as a cluster. The administrator can then select the gateway cluster to implement a specific logical router port by instantiating gateways on the host machines in the cluster. To define the gateway cluster, some embodiments provide for the administrator to specify (e.g., via a graphical user interface or command line interface that translates into application programming interface (API) commands) both the gateway host machines and a rank within the cluster for each of the gateway host machines. In some embodiments, the administrator can assign ranks to the gateway host machines specifically for consideration with respect to the implementation of a particular logical router port (e.g., such that different logical router ports might use the same set of gateway host machines but with different ranking orders).

In some embodiments, the interface allows the administrator to indicate either that the host machines should be randomly or pseudo-randomly ordered within the cluster (e.g., using a highest random weight algorithm) when considering the assignment of master and standby gateways to the host machines. Furthermore, some embodiments assign the gateways to these host machines while accounting for placing master and standby (or first standby) in different failure zones of a datacenter (e.g., different racks or sections of the datacenter, different datacenters) However, if the gateway host machines are ranked, then the assignment of master and standby gateways is performed according to those rankings, as described in more detail below. In addition, in some embodiments, the administrator may specify a subset of the gateway host machines in a cluster as preferred (and assign them ranks); if none of the host machines in the subset are available, gateways will not be assigned to either these host machines or the other host machines in the cluster (those not identified as preferred). In some embodiments, the rankings of the gateway host machines also take precedence over any assignment based on failure zones.

In some embodiments, the configuration (e.g., the gateway rankings, the assignment of a logical router port to a particular gateway) is received by a management plane or central control plane of the network control system. The network control system of some embodiments may include a central controller (or cluster of central controllers) that directly manage the gateway host machines. In such embodiments, this central controller cluster is responsible for translating the rankings (received via API from the administrator) and the health status of the gateways into an ordered list for the gateways.

In other embodiments, the network control system may include a management plane, central control plane, and local controllers that each directly manage its own gateway host machine (e.g., operating on the gateway host machine). In some such embodiments, the management plane receives the administrator configuration, and provides this information as data tuples to the central control plane. The local controllers communicate with the central control plane to provide health status information, and thus the central control plane generates the ordered list based on the rankings and the health status information. The central control plane (which may be implemented a set of central controllers operating as a cluster) passes the ordered list to the local controllers on the gateway host machines, which directly manage their respective gateways.

The ordered list generated for the gateways initially follows the ranking order set by the administrator, and the first gateway in the ordered list is designated as a master for the set of gateways. In some embodiments, the master gateway handles all of the traffic for the set of gateways, and the other forwarding elements send traffic for the logical ports implemented by the set of gateways to the master. The second, third, etc. gateways in the ordered list are designated as standby gateways in case all of the gateways ranked higher have failed (become inoperative). When a gateway becomes inoperative, a new list is generated without the gateway; thus, if the highest-ranked gateway has become inoperative, then the second-highest ranked gateway is now first in the new ordered list. However, when the highest-ranked gateway resumes operation, in some embodiments the highest-ranked gateway is listed second, rather than first, in the new ordered list. Anytime the master gateway is changed, there may be a lag during which some of the forwarding elements are sending packets to the old master. As such, the ordered list generated by the network control system preserves the current master unless that master becomes inoperative. However, in this situation, the highest-ranked gateway would become the first standby (i.e., second in the ordered list). That is, when generating a new list, some embodiments preserve the current master when possible, then order the remaining gateways (standbys) based on the configured ranking order.

Figure 1:
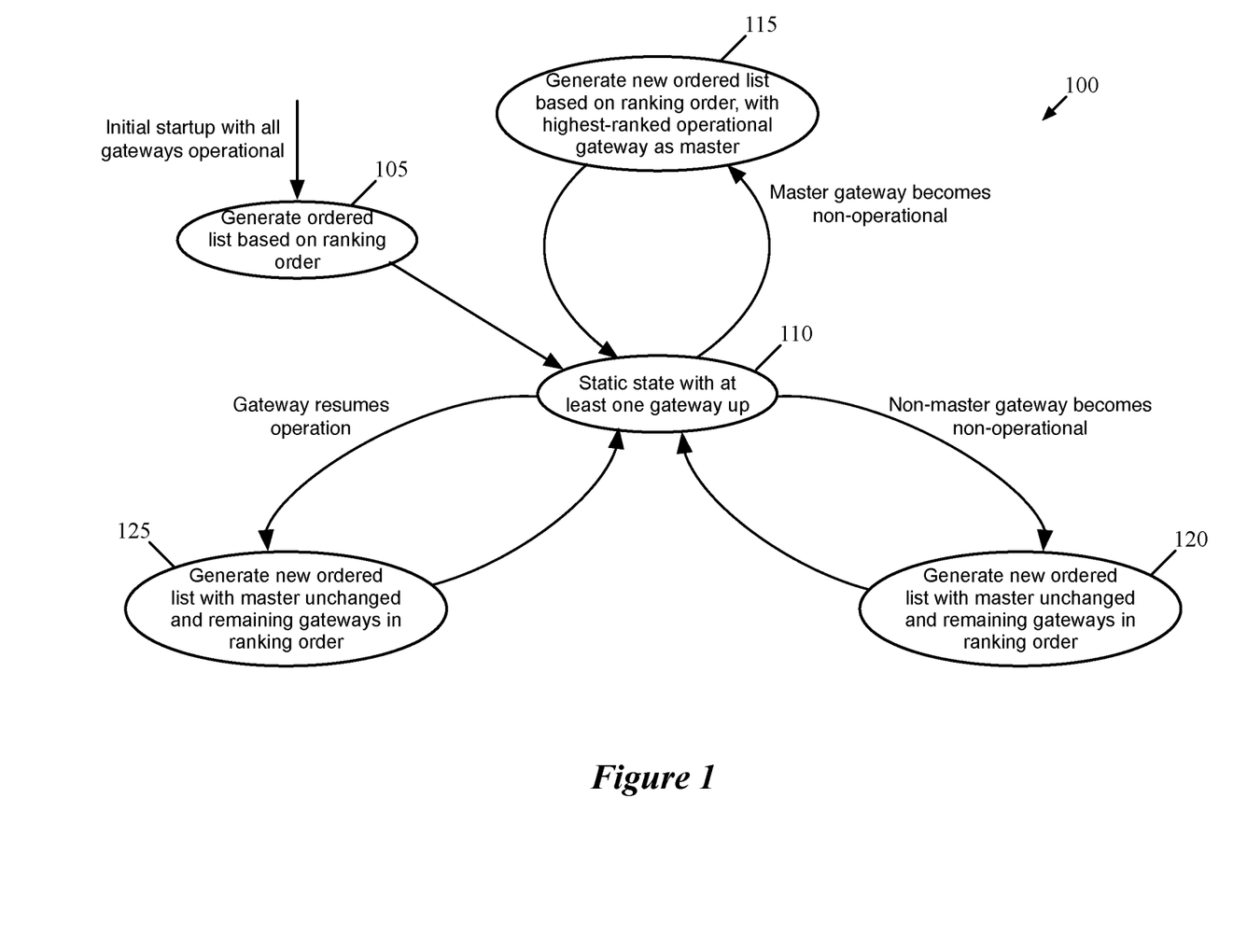
FIG. 1 conceptually illustrates a state diagram 100 that describes different states for a controller of some embodiments that manages an ordered list of gateways for a gateway cluster.

FIG. 1 conceptually illustrates a state diagram 100 that describes different states for a controller of some embodiments that manages an ordered list of gateways for a gateway cluster. It should be understood that the controller of some embodiments will have many different states relating to all different types of events and data, and that this state diagram 100 is specifically focused on events relating to the modification of an ordered list of gateways for a gateway cluster.

As shown in FIG. 1, at initial startup of the gateway cluster (e.g., when the initial configuration is received by the network control system and the ordered list is initially generated), the controller generates (at state 105) an ordered list based on the ranking order. This state diagram 100 assumes that at the outset all of the gateways are operational. In this case, the highest-ranked gateway will be first in the ordered list (and thus configured as the master gateway, to receive traffic from other MFEs that is directed to the logical router port(s) implemented by the gateway).

The controller then transitions to the static state 110, in which at least one of the gateways is operational. In this case, the controller does not perform any operations with respect to the ordered list of gateways (though, of course, the controller may perform other operations). If all of the gateways are down (reported to the controller as non-operational), then some embodiments identify the logical port itself as down and wait for at least one gateway to report that it has regained operability.

At this point, gateways may become non-operational for various reasons. Among other examples, the gateway's data connection to the external network and/or its connection to other MFEs in the logical network might go down because of a problem with the physical network interface controller (NIC) or the physical wiring for the connection. The host machine itself could shut down or restart for a variety of reasons, or the gateway implemented on the host machine might need to be removed and re-instantiated (or, if operating as a separate VM on the host machine, restarted). In addition, the underlying hardware resources (e.g., processors, memory, etc.) of the host machine might be overtaxed or not functioning well enough for the gateway to provide adequate service.

If the master gateway (the gateway currently first in the ordered list) becomes non-operational, the controller (upon detecting the non-operability) transitions to state 115 to generate a new ordered list based on the ranking order. In the new ordered list, the highest-ranking operational gateway will be the master. That is, when the master gateway goes down, then the master changes (which may cause a failover period during which other MFEs send some of their traffic for the logical port implemented by the set of gateways to the non-operational previous master). In this case, all of the operational gateways are ordered in the list based on their specified ranking. The controller then returns to state 110 (after distributing the new ordered list to the MFEs that require the information).

In some embodiments, the other MFEs have forwarding configuration information that specifies to forward data traffic for the particular logical port implemented by the gateway cluster to the master if that master is up, then to use the first standby if the master is not responsive, etc. (e.g., for flow-based MFEs, a bundle flow action). When the master gateway initially fails, there will be a time period during which the data traffic is sent to that gateway even though it is not working, until the MFEs determine for themselves (or are notified by the controller) that they should not use that gateway. In addition, anytime the master gateway changes, a certain level of traffic disruption will occur.

If a gateway other than the master (the gateway currently first in the ordered list) becomes non-operational, the controller (once the non-operability is detected) transitions to state 120 to generate a new ordered list with the master gateway unchanged and the remaining gateways ordered according to the ranking order. This will generally be the previous ordered list with the gateway that became non-operational removed. Irrespective of whether the highest-ranked gateway is the current master, the controller will not change the master gateway unless required. The controller then returns to state 110 (after distributing the new ordered list as required).

Finally, when a gateway resumes operation, the controller transitions to state 125 to generate a new ordered list with the master gateway unchanged and the remaining gateways ordered according to the ranking order. That is, even if the highest-ranked gateway was previously non-operational and become operational, this highest-ranked gateway does not become the master. This is because the controller tries to avoid changing the master, thereby causing failover disruption, whenever possible. However, if the highest-ranked gateway resumes operation after a period of downtime, then this highest-ranked gateway will be second in the ordered list (i.e., the first standby gateway). The controller then returns again to state 110.

Figure 2:
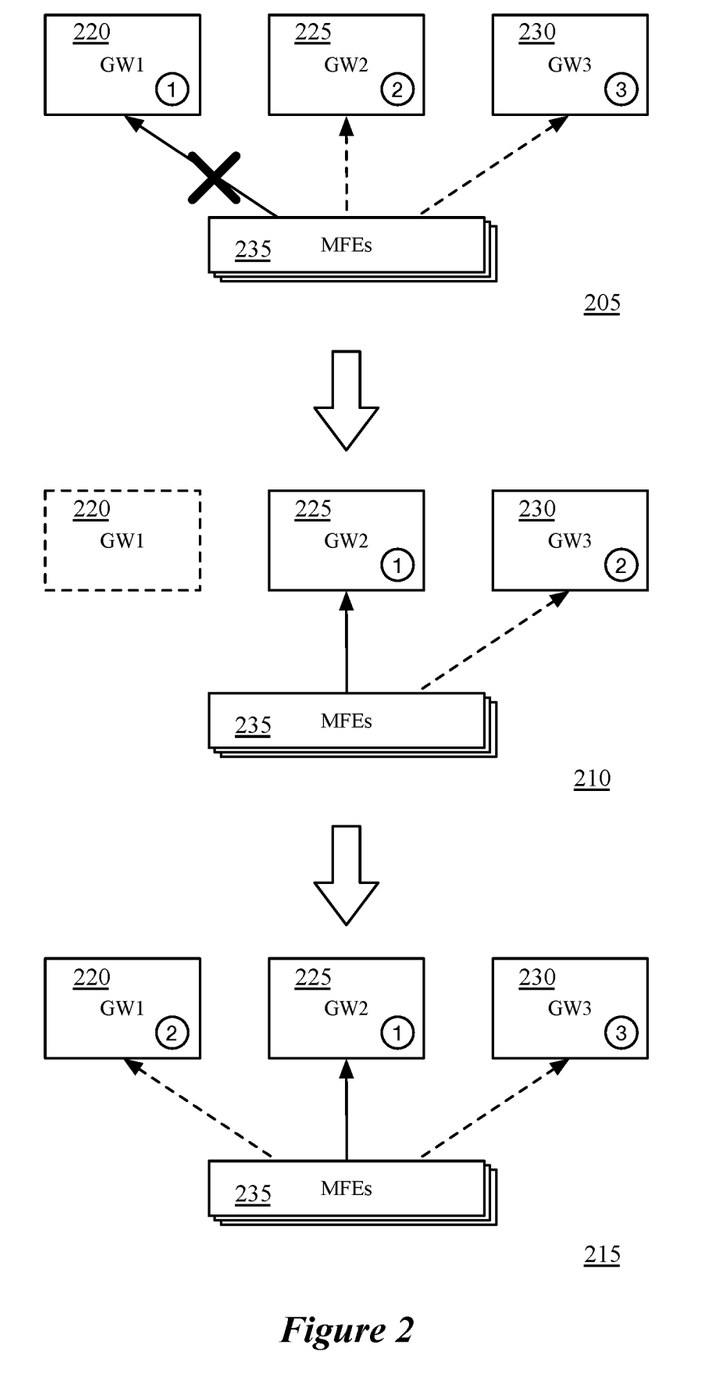
FIG. 2 conceptually illustrates an example of gateway health status changes and the corresponding ranking changes with respect to a cluster of three gateways.

FIG. 2 conceptually illustrates an example of these changes with respect to a cluster of three gateways 220-230 over three stages 205-215. The cluster of gateways 220-230 implement a logical port of a logical router. When a logical router is configured in some embodiments, the administrator may configure multiple logical ports for the logical router, and attach one or more logical switches of the logical network to these logical ports. In addition, one or more of the logical ports may be connected to another logical router or directly to a network external to the logical network. Specifically, some logical router ports (referred to as uplink ports) connect to either higher-tier logical routers (e.g., logical routers that are closer to networks external to the logical network) or directly to the external network.

These logical switches each have one or more data compute nodes (e.g., VMs, containers, etc.) that connect to the logical switch. Each stage also shows a set of MFEs 235 that forward data traffic to the set of gateways. For instance, when a data compute node attached to one of the logical switches sends traffic to destinations that are not attached to either the same logical switch or one of the other logical switches connected to the logical router, the MFEs of some embodiments (e.g., the MFE to which the sending data compute node is physically attached) forward this traffic to the gateways. On the other hand, the distributed implementation of the logical network allows that MFE to send east-west traffic (i.e., traffic to destinations on the same logical switch or other logical switches of the logical router) to another of the MFEs 235 directly (e.g., via a tunnel), without requiring use of the gateway.

While many aspects of the logical routers are implemented in a distributed manner, the implementation of the uplink ports are centralized with the gateways. These ports may include stateful services that require centralization, or may be centralized to implement the connection to the external network (which might include peering with the physical routers, stateful NAT operations, etc.). Especially in the case of stateful services, the centralized components may be arranged in a master-standby manner. For instance, a logical router with a single uplink port that requires centralized stateful services might have a master centralized component and one or more standby centralized components, each of which are implemented on separate gateways. The administrator, in some such embodiments, specifies a set of gateways to implement the logical router uplink port, and the centralized components operate on the gateway set with the master/standby configuration determined according to the ordered list for the set of gateways.

As shown in the first stage 205, initially all three of the gateways 220-230 are up. These gateways are illustrated with encircled numbers 1, 2, and 3 that represent their current order in an ordered list generated by the network control system (not shown) that manages the gateways 220-230 and the MFEs 235. The gateways are also shown in their administrator-specified ranking order, with the first gateway 220 the highest-ranked, the second gateway 225 the second highest-ranked, and the third gateway 230 the lowest-ranked. At this initial stage, the highest-ranked gateway 220 is designated as the master gateway and the second-highest ranked gateway 225 is designated as the first standby. Thus, as shown by the solid arrow (as compared to the dashed arrows to the other two gateways), the MFEs 235 send traffic for the logical port implemented by the gateway cluster to the first gateway 220.

However, at this first stage 220, the master gateway 220 becomes non-operational (e.g., the host machine shuts down, the physical NIC used by the gateway goes down, etc.). As a result, the network control system generates a new ordered list for the gateways, reflected in the second stage 210. As shown here, the ordered list only includes two of the gateways 225 and 230; the first (and highest-ranked) gateway 220 is not currently operational. Thus, the second gateway 225 is designated as the master gateway and the third gateway 230 is designated as the first standby gateway.

By the third stage 215, the first gateway 220 has resumed operation. However, as shown at this stage, the network control system generates a new ordered list that maintains the second-ranked gateway 225 as the master gateway, though the highest-ranked gateway 220 is now the first standby gateway based on the ordered list. This avoids a second failover from having the master switch unnecessarily from the second gateway 225 to the first gateway 220, which would require new forwarding data to be sent to the MFEs 235 (and to the gateways themselves) and cause some amount of disruption in the traffic flow. With the exception of maintaining the same master gateway, however, the rest of the gateways (the standbys) are ordered according to their administrator-specified rank.

As mentioned, the network control system (e.g., a centralized network controller, in some embodiments via local controllers) is responsible in some embodiments for distributing forwarding and configuration data to the MFEs and gateways. When gateway health status changes (or if the administrator re-ranks the gateways), the central controller generates and distributes a new ordered list for the gateway cluster. In addition, the network controllers (in some embodiments the central controller cluster, in other embodiments each of the local controllers) generate new forwarding data based on this ordered list (e.g., bundle flow entries for flow-based MFEs). The use of fixed points (i.e., distributing forwarding and configuration data in groups for consistency, rather than simply distributing the data as it is generated) generally alleviates potential problems of inconsistent state while new forwarding data is distributed.

In addition, when ranking is used for a gateway cluster and the controller uses the ordered list to preserve the master whenever possible, the network control system of some embodiments configures the gateway using a specific flag in the configuration data (e.g., a non-preemptive flag). In some embodiments, this flag is used by the gateway (e.g., by a daemon, application, or local controller that manages the gateway) upon gateway recovery (i.e., when the gateway returns to operation after a downtime). When the flag is set, the gateway manager reports to the central controller (e.g., via a local controller in some embodiments) that the gateway is now healthy, but presents an appearance to the local MFE that the gateway does not accept traffic. This allows the network control system to generate new forwarding data according to the correct ordered list. Once this forwarding data is distributed to the MFEs, then the network control system provides the gateway manager with another signal to allow the gateway to accept data traffic.

Figure 3:
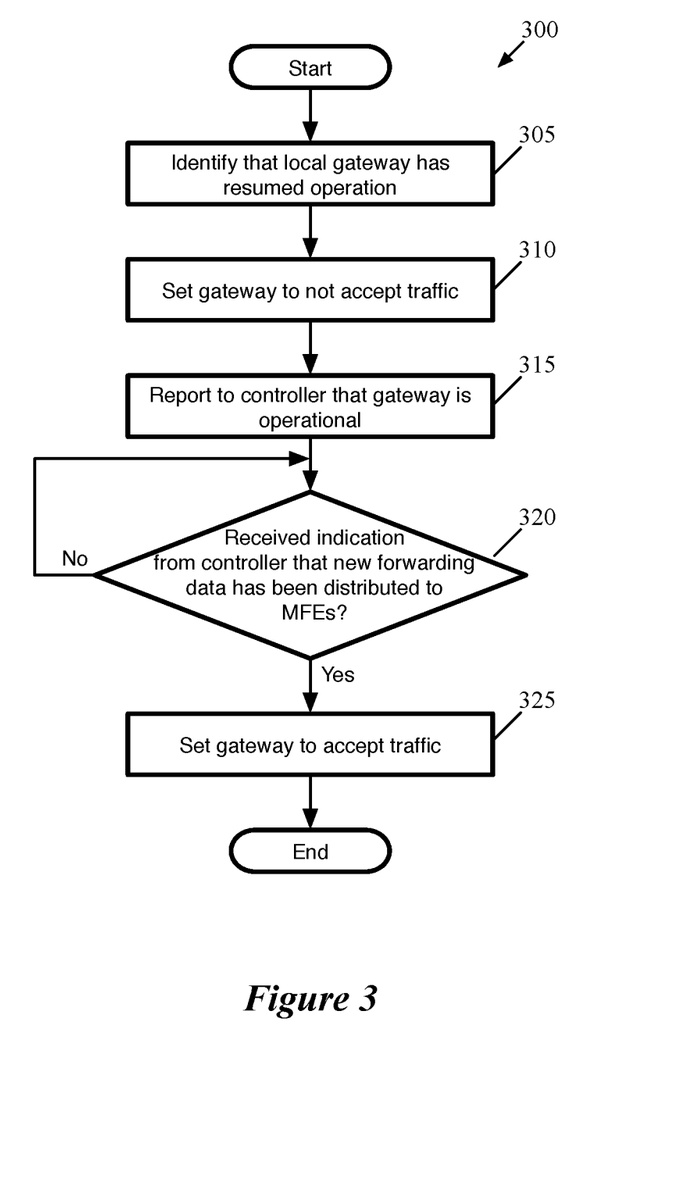
FIG. 3 conceptually illustrates a process of some embodiments for managing the status of a gateway upon recovery of the gateway.

FIG. 3 conceptually illustrates a process 300 of some embodiments for managing the status of a gateway upon recovery of the gateway. In some embodiments, this process 300 is performed by a gateway health management daemon that (i) monitors the health status of one or more gateways operating on a gateway host machine and (ii) reports this health status to the network control system. In some embodiments, the gateway health management daemon also notifies the MFE operating on the same host machine as the gateway regarding whether the gateway is accepting traffic. This process 300 may also be performed by a local controller, operating on the host machine with the gateway in other embodiments, which manages the MFE and the gateway.

As shown, the process 300 begins by identifying (at 305) that a local gateway has resumed operation. As mentioned, in some embodiments multiple gateways operate on the same host machine, and the gateway health management daemon (or other manager on the host) manages all of the gateways operating on that host machine. Some of these gateways may not belong to clusters that use ranking and that try to maintain the master whenever possible. However, the process 300 is performed when a gateway that does belong to such a cluster returns from previously being non-operational. This gateway may or may not be the highest-ranked gateway in its cluster.

The process then sets (at 310) the gateway to not accept traffic. In some embodiments, the gateway health management daemon notifies the MFE operating on the gateway host machine that the gateway is still non-operational. In some embodiments, MFEs on the gateway hosts perform the direct communication with MFEs on the various other host machines that implement the logical network (e.g., managing tunnels, performing logical forwarding operations, etc.). By giving the appearance to the MFE that the gateway is still non-operational, the gateway is prevented from receiving data traffic.

The process 300 also reports (at 315) to the controller that the gateway is operational. In some embodiments, when the gateway health management daemon reports to a local controller, this local controller synchronizes this information with a central controller. If the daemon reports directly to a central controller, then this information is shared directly. In either case, this causes the controller to update the ordered list and subsequently update the forwarding data for the MFEs (e.g., the bundle flow actions for flow-based MFEs).

The process then determines (at 320) whether an indication has yet been received from the controller that new forwarding data has been distributed to the MFEs by the controller. The process continues in this state until such an indication is received. It should be understood that in some embodiments this actually functions as a "wait" state until the daemon receives an indication from the controller, rather than the process repeatedly checking whether such an indication is received.

In either case, once the indication is received from the controller that new forwarding data has been distributed to the MFEs, the process sets (at 325) the gateway to accept traffic. That is, the gateway health management daemon of some embodiments gives the appearance to the MFE that the gateway is now operational. By holding off until the new forwarding data is distributed, the gateway avoids a double failover in the situation that a master gateway goes down and recovers before the controller is able to distribute new forwarding data.

That is, when the master goes down in some embodiments, the other MFEs will switch over to forwarding their packets to the first standby gateway (because, e.g., they will notice that the tunnel to the gateway is down). If the master comes back up before the controller has pushed new forwarding data, then the other MFEs will switch back to forwarding their packets to the master, as their forwarding data specifies this gateway as the master. Once the forwarding data is distributed, the MFEs will switch again to the new master (previous standby) according to the new forwarding data. Thus, in some embodiments, the health manager daemon does not allow the original master to advertise itself as available until the switch to the original standby gateway is complete.

Figure 4:
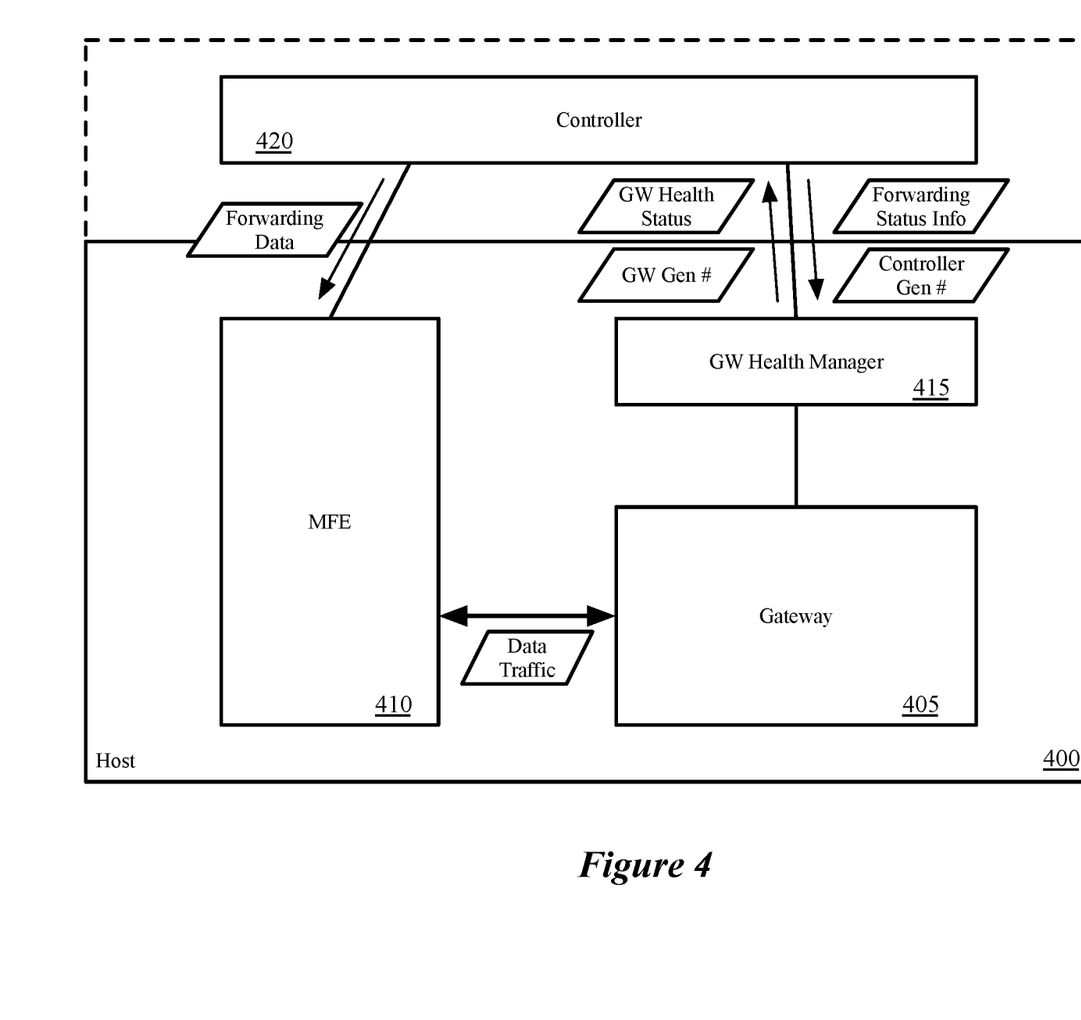
FIG. 4 conceptually illustrates the architecture of a gateway host machine of some embodiments and data passed between certain entities operating on the gateway host machine.

FIG. 4 conceptually illustrates the architecture of a gateway host machine 400 of some embodiments and data passed between certain entities operating on the gateway host machine. Specifically, as shown, the host machine 400 includes a gateway 405, a MFE 410, and a gateway health manager 415. It should be understood that other modules or entities may operate on the gateway host of some embodiments, as shown in greater detail in U.S. Patent Publication 2015/0063360, which is incorporated herein by reference.

The gateway 405 may operate as a separate virtual machine or container (e.g., a namespace) on the gateway host machine 400, in some embodiments. As described above, the gateway 405 implements a logical port of a logical router, and may include both routing tables (e.g., for routing packets entering or exiting a logical network) and centralized services (e.g., stateful services). The gateway 405 may be part of a gateway cluster with gateways on other gateway hosts, and may be a master or standby gateway depending on its rank within the cluster (and the past and present health statuses of itself and the other gateways in the cluster)

The MFE 410 functions as a tunnel endpoint for traffic sent to and from the gateway 405 (e.g., by tunneling packets to other MFEs). In addition, the MFE 410 performs logical processing on packets before and/or after their processing by the gateway 405. For example, in some embodiments, when the gateway 405 receives a packet from an external source, this packet is initially processed by the MFE, which identifies the gateway as the initial destination. The gateway routes the packet and performs any additional processing, then returns the packet to the MFE. At this point, the MFE acts as a first-hop MFE and performs logical forwarding for the packet to identify its destination within the logical network, then tunnels the packet to another MFE for delivery to the packet's destination (e.g., a data compute node attached to a logical switch of the logical network). Thus, as shown in the figure, the gateway 405 and the MFE 410 exchange tunnel traffic.

The gateway health manager 415 of some embodiments monitors the health status of the gateway 405. In some embodiments, this health manager is a daemon that is responsible for reporting to the controller 420 when the gateway 405 and/or the host 400 is no longer healthy and should be taken out of use, thereby enabling the controller to modify the ordered list of gateways and the forwarding data for the MFE 410 (and other MFEs that forward traffic to the gateway). In some embodiments, this daemon 415 monitors various aspects of the gateway host machine 400, its connections, the gateway 405, etc. This may include monitoring the local hardware resources, the physical NIC(s) used by the gateway 405 and/or MFE 410, the data compute node acting as the gateway 405, etc.

In addition, FIG. 4 illustrates a network controller 420. As shown by the dashed line, this controller may be a central controller that manages the MFE 410 and gateway health manager 415 as well as MFEs and other entities on other host machines that implement aspects of the logical network, or a local controller that directly manages only the entities on the host machine 400, and receives configuration information from a central controller (and sends health information, etc., to the central controller).

As shown in the figure, the controller 420 provides forwarding data (e.g., flow entries or other data for configuring forwarding behavior) to the MFE 410, in order for the MFE 410 to implement one or more logical networks. The gateway health manager 420, as described by reference to FIG. 1, provides the gateway health status to the controller 100 (notifying the controller when the gateway 405 either becomes non-operational or returns to operability), and receives forwarding status information from the controller (e.g., an indication that the forwarding rules distributed by the controller 420 account for the most recent health status of the gateway 420). In some embodiments, the controller 420 and the gateway health manager 415 communicate via a database protocol (e.g., OVSDB), with both writing data to and reading data from a database (not shown in the figure).

In some embodiments, the controller 420 and the gateway health manager 415 use generation counters (finite state machines) to communicate with each other during failover situations (e.g., to accomplish the purpose of the process 100). Specifically, the controller and the gateway health manager each maintain a generation number that is read by the other entity. Each time the gateway transitions from unhealthy (non-operational) to healthy (operational), the gateway health manager increments its generation number (which is read by the controller). Each time the controller accounts for this return to health by generating a new ordered list and distributing the requisite forwarding data, it increments its generation number (which is read by the gateway health manager). When these two generation numbers are equal, this indicates that both the controller and the gateway health manager have agreed that the gateway can start processing traffic.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
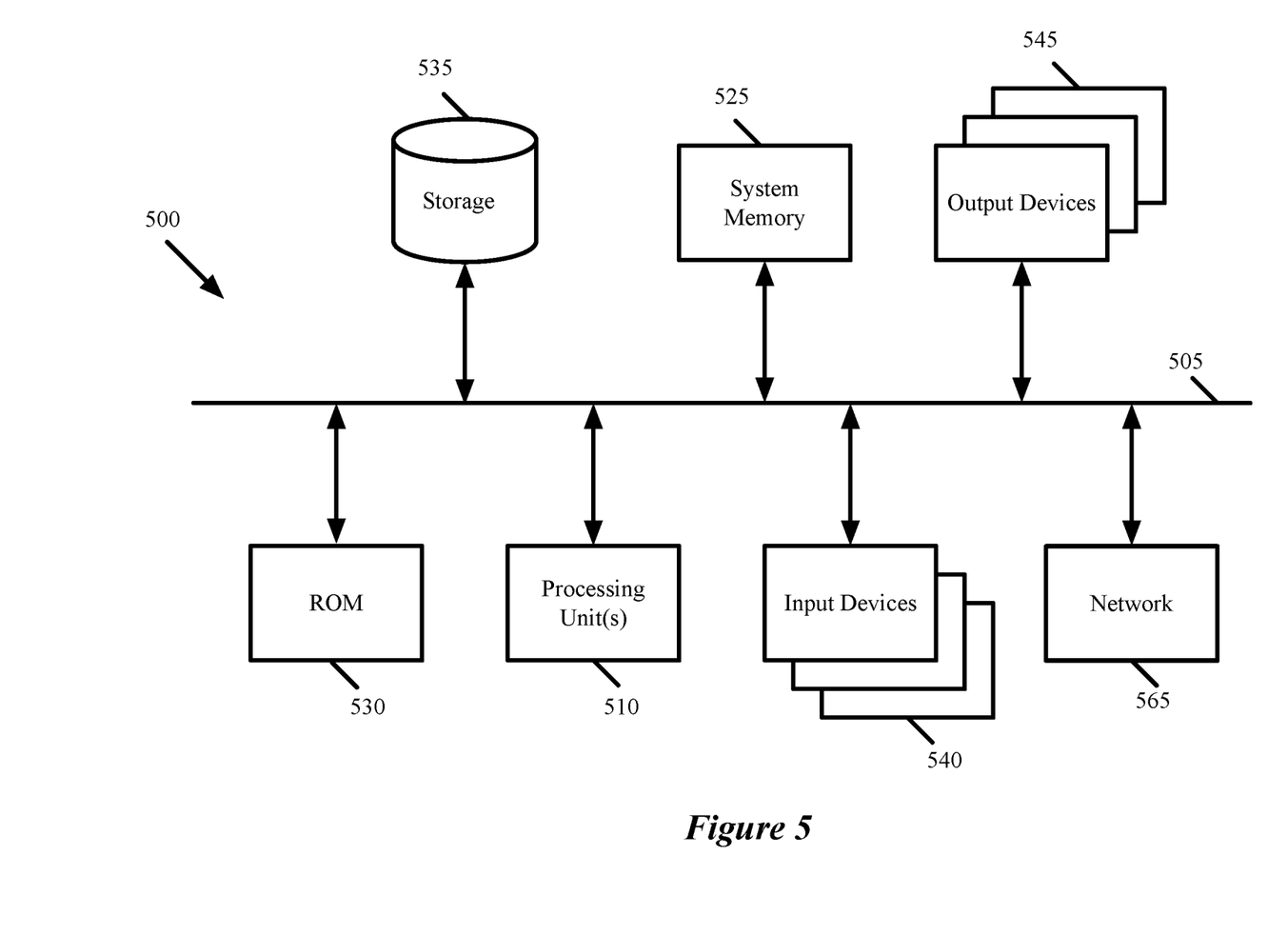
FIG. 5 conceptually illustrates an electronic system with which some embodiments of the invention are implemented.

FIG. 5 conceptually illustrates an electronic system 500 with which some embodiments of the invention are implemented. The electronic system 500 can be used to execute any of the control, virtualization, or operating system applications described above. The electronic system 500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments.

The read-only-memory (ROM) 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a logical network comprising a logical router implemented across a plurality of host computers that execute a plurality of managed forwarding elements (MFEs), a method for managing a set of gateways that are different than the plurality of MFEs and that implement a particular logical port of the logical router through which data messages are sent from the logical network to a particular network external to the logical network, the method comprising:
at a central controller,
receiving configuration data specifying a ranking order of the gateways in the set of gateways;
configuring the plurality of MFEs to use a first gateway as a master gateway to send data message traffic through the particular logical port to the external network, wherein the first gateway is first in the specified ranking order;
upon receiving a first notification that the first gateway is not operational, configuring the plurality of MFEs to use a second gateway as the master gateway to send data message traffic through the particular logical port to the external network, wherein the second gateway is second in the specified ranking order; and
upon receiving a second, subsequent notification that the first gateway has resumed operation, maintaining the second gateway as the master gateway in order to avoid disrupting data message traffic from the logical network to the external network.

2. The method of claim 1, wherein configuring the plurality of MFEs that implement the logical network comprises configuring the plurality of MFEs to use the master gateway to send data message traffic to the external network.

3. The method of claim 2, wherein the logical network further comprises a plurality of logical switches that connect to the logical router through logical ports other than the particular logical port, wherein the particular logical port is an uplink port through which data messages are sent to and received from the external network.

4. The method of claim 3, wherein the uplink port logically connects to another logical router.

5. The method of claim 3, wherein the uplink port logically connects to a set of physical routers external to the logical network.

6. The method of claim 1, wherein the set of gateways implements a plurality of logical uplink ports of a plurality of logical routers.

7. The method of claim 1, wherein the received configuration data is a first configuration data comprising a first ordered list that specifies, in order, (i) the first gateway, (ii) the second gateway, and (ii) a third gateway.

8. The method of claim 7, wherein the second and third gateways operate as first and second standby gateways when the first gateway is the master.

9. The method of claim 7 further comprising
defining a second configuration data comprising a second ordered list that specifies, in order, (i) the second gateway and (ii) at least the third gateway, and does not include the first gateway; and
using the second configuration data to configure the plurality of MFEs to use the second gateway as the master gateway.

10. The method of claim 9, wherein maintaining the second gateway as the master gateway comprises defining a third configuration data comprising a third ordered list that specifies, in order, (i) the second gateway, (ii) the first gateway, and (iii) at least the third gateway.

11. The method of claim 1 further comprising distributing an ordered list of the set of gateways to a set of controllers that manage the set of gateways.

12. The method of claim 11 wherein configuring the plurality of MFEs comprises communicating configuration data comprising the ordered list to local controllers that execute on the plurality of host computers and that manage each of the MFEs in the plurality of MFEs.

13. The method of claim 12, wherein a particular local controller receives the ordered list and configures its corresponding MFE to forward data messages, for the particular logical port implemented by the gateways, based on the ordered list.

14. The method of claim 13, wherein the data messages are forwarded according to a bundle flow that specifies the first gateway in the ordered list as a first choice and the second gateway in the ordered list as a next choice to use only if the first gateway in the ordered list is unavailable.

15. A non-transitory machine readable medium storing a central controller program which when executed by at least one processing unit manages a set of gateways in a logical network comprising a logical router implemented across a plurality of host computers that execute a plurality of managed forwarding elements (MFEs), the gateways, that are different than the plurality of MFEs, implementing a particular logical port of the logical router through which data messages are sent from the logical network to a particular network external to the logical network, the central controller program comprising sets of instructions for:
receiving configuration data specifying a ranking order of the gateways in the set of gateways;
configuring the plurality of MFEs to use a first gateway as a master gateway to send data message traffic through the particular logical port to the external network, wherein the first gateway is first in the specified ranking order;
upon receiving a first notification that the first gateway is not operational, configuring the plurality of MFEs to use a second gateway as the master gateway to send data message traffic through the particular logical port to the external network, wherein the second gateway is second in the specified ranking order; and
upon receiving a second, subsequent notification that the first gateway has resumed operation, maintaining the second gateway as the master gateway in order to avoid disrupting data message traffic from the logical network to the external network.

16. The non-transitory machine readable medium of claim 15, wherein the logical network further comprises a plurality of logical switches that connect to the logical router through logical ports other than the particular logical port, wherein the particular logical port is an uplink port through which data messages are sent to and received from the external network.

17. The non-transitory machine readable medium of claim 15, wherein the received configuration data is a first configuration data comprising a first ordered list that specifies, in order, (i) the first gateway, (ii) the second gateway, and (ii) a third gateway.

18. The non-transitory machine readable medium of claim 17, further comprising a set of instructions for:
defining a second configuration data comprising a second ordered list that specifies, in order, (i) the second gateway and (ii) at least the third gateway, and does not include the first gateway; and
using the second configuration data to configure the plurality of MFEs to use the second gateway as the master gateway.

19. The non-transitory machine readable medium of claim 18, wherein the set of instructions for maintaining the second gateway as the master gateway comprises a set of instructions for defining a third configuration data comprising a third ordered list that specifies, in order, (i) the second gateway, (ii) the first gateway, and (iii) at least the third gateway.

20. The non-transitory machine readable medium of claim 15 further comprising distributing an ordered list of the set of gateways to a set of controllers that manage the set of gateways, wherein the set of instructions for configuring the plurality of MFEs comprises a set of instructions for communicating configuration data comprising the ordered list to local controllers that execute on the plurality of host computers and that manage each of the MFEs in the plurality of MFEs.

21. The non-transitory machine readable medium of claim 20, wherein a particular local controller receives the ordered list and configures its corresponding MFE to forward data messages, for the particular logical port implemented by the gateways, based on the ordered list, wherein the data messages are forwarded according to a bundle flow that specifies the first gateway in the ordered list as a first choice and the second gateway in the ordered list as a next choice to use only if the first gateway in the ordered list is unavailable.

* * * * *